(12) United States Patent
Nguyen et al.

(10) Patent No.: US 8,165,591 B2
(45) Date of Patent: Apr. 24, 2012

(54) PROCESS TO ALLOCATE CHANNELS IN A SECTORIZED CELLULAR NETWORK

(75) Inventors: Vincent AnhDzung Nguyen, Chicago, IL (US); Peng-Jun Wan, LaGrange Park, IL (US); Ophir Frieder, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 1433 days.

(21) Appl. No.: 10/114,786

(22) Filed: Apr. 3, 2002

(65) Prior Publication Data

US 2004/0106411 A1    Jun. 3, 2004

(51) Int. Cl.
*H04W 40/00* (2009.01)

(52) U.S. Cl. ...... 455/447; 455/450; 455/63.4; 455/63.1; 455/422.1; 455/446; 455/67.11; 455/509; 455/524

(58) Field of Classification Search .................. 455/447, 455/450, 446, 509, 63.4, 25; 370/329, 330
See application file for complete search history.

(56) References Cited

U.S. PATENT DOCUMENTS

| | | | |
|---|---|---|---|
| 4,128,740 A | 12/1978 | Graziano | |
| 4,144,411 A | 3/1979 | Frenkiel | |
| 5,073,971 A * | 12/1991 | Schaeffer | ...................... 455/447 |
| 5,111,534 A | 5/1992 | Benner | |
| 5,268,694 A | 12/1993 | Jan et al. | |
| 5,307,507 A | 4/1994 | Kanai | |
| 5,365,571 A | 11/1994 | Rha et al. | |
| 5,428,818 A | 6/1995 | Meidan et al. | |
| 5,555,257 A | 9/1996 | Dent | |
| 5,594,941 A | 1/1997 | Dent | |
| 5,619,503 A | 4/1997 | Dent | |
| 6,021,309 A | 2/2000 | Sherman et al. | |
| 6,078,815 A | 6/2000 | Edwards | |
| 6,127,988 A | 10/2000 | McNichol | |
| 6,201,801 B1 | 3/2001 | Dent | |
| 6,212,385 B1 | 4/2001 | Thomas et al. | |
| 6,212,386 B1 | 4/2001 | Briere et al. | |
| 6,269,245 B1 * | 7/2001 | Li et al. | .......................... 455/450 |
| 6,301,233 B1 | 10/2001 | Ku et al. | |

(Continued)

FOREIGN PATENT DOCUMENTS

EP        1 028 599 A2    2/2000

(Continued)

OTHER PUBLICATIONS

Li-Chung Wang: *A New Cellular Architecture Based on Interleaved Cluster Concept*, IEEE Transaction on Vehicular Technology, vol. 48, No. 6, pp. 1809-1818, Nov. 1999.

Vincent A. Ngugyen et al.: *Channel Alternation and Rotation for Tri-sectored Directional Antenna Cellular Systems*, IEEE Vehicular Technology Conference-Fall, Atlantic City, New Jersey, Oct. 2001.

*Primary Examiner* — Willie J Daniel, Jr.
(74) *Attorney, Agent, or Firm* — Pauley Peterson & Erickson

(57) ABSTRACT

The invention disclosed is a process to allocate channels in a sectorized cellular network. A system of allocating cellular frequencies (channels) to the sectors among the cells within a tile is disclosed which maximizes channel set usage within the tile while avoiding co-channel interference between cells. According to the present system, no infrastructure rebuild is required. The disclosed approach further supports all currently used cellular technology. By alternating and rotating the channel assignments across sectors, what is a seemingly locally poor algorithm utilizing additional local channels is actually a globally good algorithm which is efficient in terms of the total number of channels used owing to short reuse distance and low number of cell types.

13 Claims, 7 Drawing Sheets

U.S. PATENT DOCUMENTS

| | | |
|---|---|---|
| 6,311,068 B1 | 10/2001 | Leung et al. |
| 6,320,867 B1 | 11/2001 | Bellenger et al. |
| 6,339,708 B1 * | 1/2002 | Wang .......................... 455/447 |
| 6,522,885 B1 * | 2/2003 | Tang et al. ................... 455/447 |
| 6,643,277 B2 * | 11/2003 | Garrison et al. ............. 370/329 |
| 6,748,218 B1 * | 6/2004 | Johnson et al. .............. 455/446 |
| 2003/0190918 A1 * | 10/2003 | Frieder et al. ................ 455/450 |

FOREIGN PATENT DOCUMENTS

| | | |
|---|---|---|
| WO | WO 00/79704 A1 | 12/2000 |
| WO | WO 01/76106 A2 | 10/2001 |

* cited by examiner

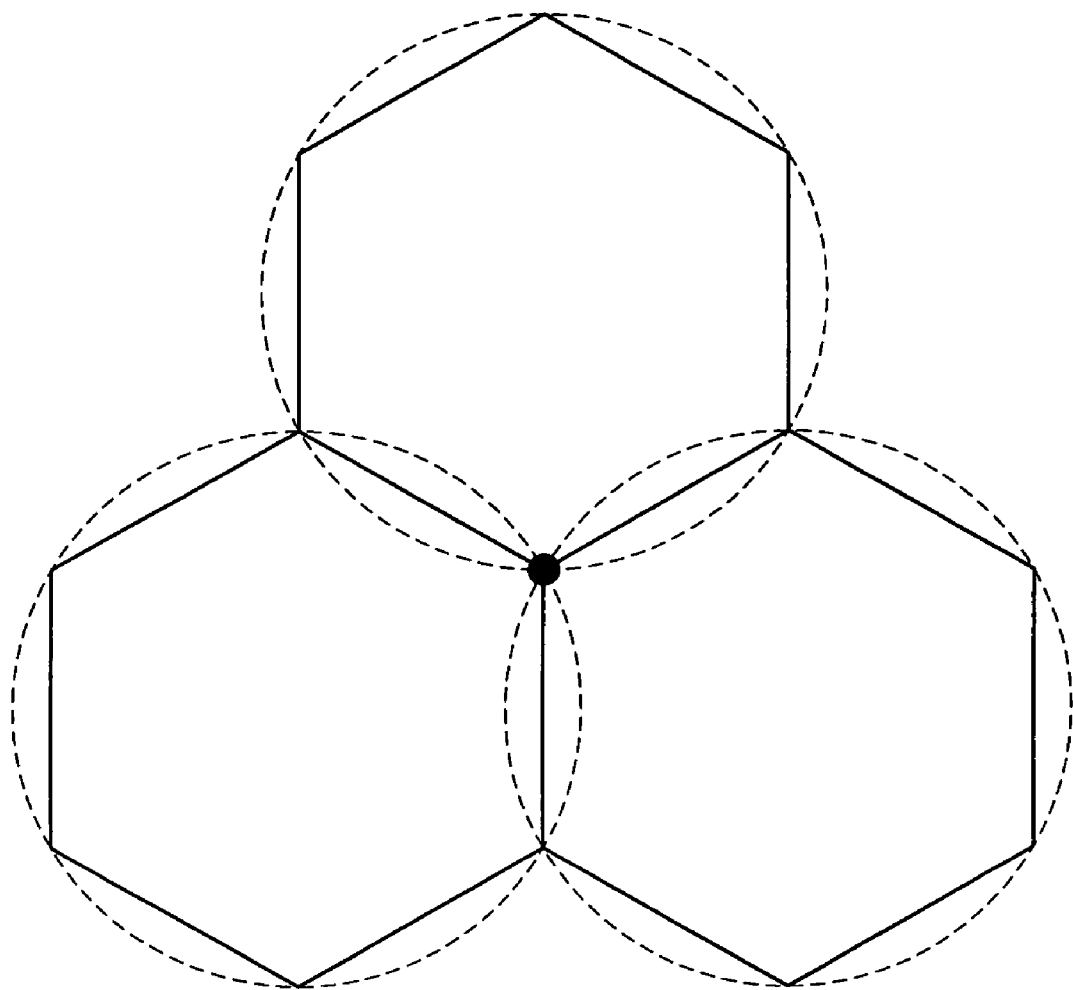
FIG.10    NARROW BEAM
(PRIOR ART)

PROCESS TO ALLOCATE CHANNELS IN A SECTORIZED CELLULAR NETWORK

BACKGROUND OF THE INVENTION

1. Field of the Invention

The present invention relates to sectorized cellular communication networks and more particularly to the allocation/assignment of radio frequencies, also referred to as channels, among the sectors across a group of cells.

2. Discussion of the Related Art

Cellular communications frequencies, or channels, are limited, expensive, and in great demand. Therefore, the goal of the cellular communications system operator is to maximize cellular usage with the smallest number of channels. Co-channel interference degrades communications quality, further restricting the ability of the cellular operator to provide reliable service with minimal channels. Rebuilds of existing system infrastructure are expensive and therefore undesirable.

Referencing FIG. 1, those persons having ordinary skill in the art will recognize that for purposes of the present discussion, a cell 21 is an area controlled by a central base station 23 with a multiple number of assigned frequencies, or channels. Each channel defines a sector, collectively 25, which is a geographic area covered by one frequency within a cell 21. Referencing FIG. 2, within a cellular system, or coverage area 19, a tile, also sometimes called a cluster, 27, e.g. 27a, 27b, and 27c, is a pattern of contiguous cells mapped with complete frequency usage and repetition, i.e., a number of cells in a nonrepeating pattern which have had channels assigned thereto.

In a cellular system 19, it is conventional to employ three 100-120 degree directional antennae at each base station 23 to provide a cell 21 with three sectors 25, i.e., the cell 21 is "trisectorized". The frequencies allotted to the cell are then reused in a simple fixed pattern to derive tiles of, e.g., 3, 4, or 7 cell types dependant upon the number of frequencies available to the system operator for supporting the desired channel separation. Based on the current fixed channel assignment schemes, three disjoined channel sets are assigned to each base station and repeated uniformly in all tiles to provide equidistant separation among co-channel cells, i.e., cells using the same frequencies. In FIG. 2 for example, the operator uses nine channels to supply the three adjacent cell types, A, B, and C. Cell type A uses channels 1, 4, and 7. Cell type B, utilizes channels 2, 5, and 8. Cell type C utilizes channels 3, 6, and 9. However, the conventional fixed pattern of channel allocation does not take full advantage of antenna directivities and channel allocation schemes to maximize frequency reuse.

Maximum efficiency would generally call for the shortest channel reuse distance and the smallest number of cell types. Known schemes proposed to maximize channel reuse within a cellular system have included interleaved/rotated channel assignments as presented in the paper Wang, *A New Cellular Architecture based on an Interleaved Cluster Concept*, IEEE Transactions on Vehicular Technology, vol. 48. no. 6, pp. 1809-1818, November 1999. The interleaved system of Wang, however, will not support wide band cellular systems and may require rebuilds or relocations for additional base stations. U.S. Pat. No. 6,311,068 to Leung, et al. suggests a channel rotation scheme but calls for rebuild using four 90-degree directional antennae. Certain details of the concept of the present invention have been discussed in the paper Nguyen, et al., *Channel Alternation and Rotation For Tri-sectored Directional Antenna Cellular Systems*, IEEE Vehicular Technology Conference-Fall, Atlantic City, N.J., October 2001, which is herein incorporated by reference.

What is needed in the art is an efficient system of channel allocation supporting the present cellular infrastructure without rebuilds, to increase cellular traffic without degrading the quality of transmission.

SUMMARY OF THE INVENTION

The present invention provides for the above-stated need by a Channel Alternation and Rotation scheme having a conceptually simple, although not intuitively obtainable, technique that locally utilizes more than the minimum number of channels needed for a simple rotation allocation to achieve a globally greater coverage with an overall demand for less channels.

The present invention provides a process to allocate channels in a sectorized cellular network. A system of allocating cellular frequencies, or channels, to the sectors among the cells within a tile is disclosed which minimizes reuse distance and maximizes channel usage within the tile while minimizing co-channel interference between cells. According to certain aspects of the present invention, an algorithm is presented wherein a grid of cells may be indexed by row and column in a first step. A second step then labels, or applies, the cell types in appropriate positions on the grid. Distinct channel groups are selected for each cell type and the sectors of the cells have the channel groups allocated thereto in a manner so as to minimize co-channel interference. The present invention can further support multiple sectorized technologies such as the currently used broad beam and narrow beam cellular technology and requires no infrastructure rebuild.

By alternating and rotating the channel assignments across sectors, what is a seemingly locally poor channel choice utilizing additional local channels, is actually a globally good algorithm that is more efficient in terms of the total number of channels used.

According to one aspect of the present invention, frequencies are assigned in an S+X group, where S equals the number of sectors within a cell and X is the additional number of channels locally used in each cell type. The channels are divided into a rotating group and an alternating group. As a row of cells has the frequencies allocated to the sectors, the rotating frequency allocations are rotated between columns, i.e., positions of frequency sectors between the cells of a given type are revolved between or among a given group of sectors (i.e., a channel set). The alternating group channels are alternated, i.e., substituted between cells of sequential columns. Rotating and alternating channel pairs may then be reversed in their designation between rows to avoid co-channel, and especially front lobe, interference. This allocation process can result in a shorter reuse distance, less cell types, and the consequent use of a smaller number of frequencies to support the same number of simultaneous users, or conversely, a greater number of simultaneous users within a fixed channel allotment. Cells of the same type may occur adjacently with sufficient channel separation to avoid interference. Thus, a tile, for example, may have only two cell types, with each cell type utilizing four channels, resulting in a so called 2x(3+1) reuse plan, or more generally an Nx(S+X) reuse plan where N designates the number of cell types, S designates the number of sectors, and X designates the number of additional channels necessary to complete the alternation scheme.

In one embodiment, the present invention may allow a tile to be composed of first and second, or A-type and B-type trisectorized cells. A-type cell columns and rows alternate with B-type cell columns and rows, with columns having adjacent co-channel cells while the co-channel cells in the rows are separated by sectors of opposite cell types. At least one additional channel is added to the channel group required for the number of sectors per cell, e.g., 3+1 for a trisectorized cell. For a given row, a rotating pair is selected for placement in the given sectors, e.g., a and b sectors, and rotated at each column change. Another given sector, e.g., c sector, is given one of the pair of alternating channels and the alternating channel is switched for that given sector at each column. When beginning the next row of the same cell type, the alternating pair becomes the rotating pair and the rotating pair becomes the alternating pair. The first channel allocation of the alternating row is selected to avoid front lobe interference with the previous row of that type. Thus, e.g., in a 2x(3+1) reuse plan, with only eight channels and two cell types, a tile of eight cells may be utilized to cover any cellular system. The present method will, of course, also work for other multiples of cell type and sector division in common use.

BRIEF DESCRIPTION OF THE DRAWINGS

FIG. 10 is a schematic of a trisectorized cell of the narrow beam transmission cell type.

DETAILED DESCRIPTION

The present invention is described below in terms of an exemplary embodiment of two trisectorized cell types for purposes of clarity and ease of explanation. The person having ordinary skill in the art will appreciate that the techniques and systems described herein can be applied to a number of sectorized cellular communications systems and are not intended to be limited to the described exemplary embodiments. For example, the techniques described may be applied to cellular systems with a greater number of sectors or cell types, or less number of cell types.

Figure 1:
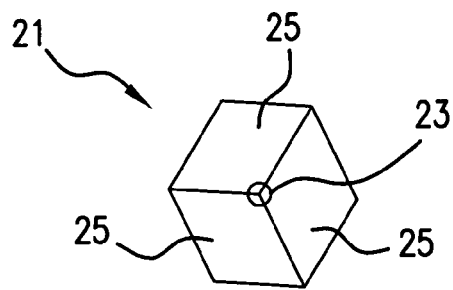
FIG. 1 is a schematic of a known trisectorized cell of the wide beam transmission cell type.
Figure 2:
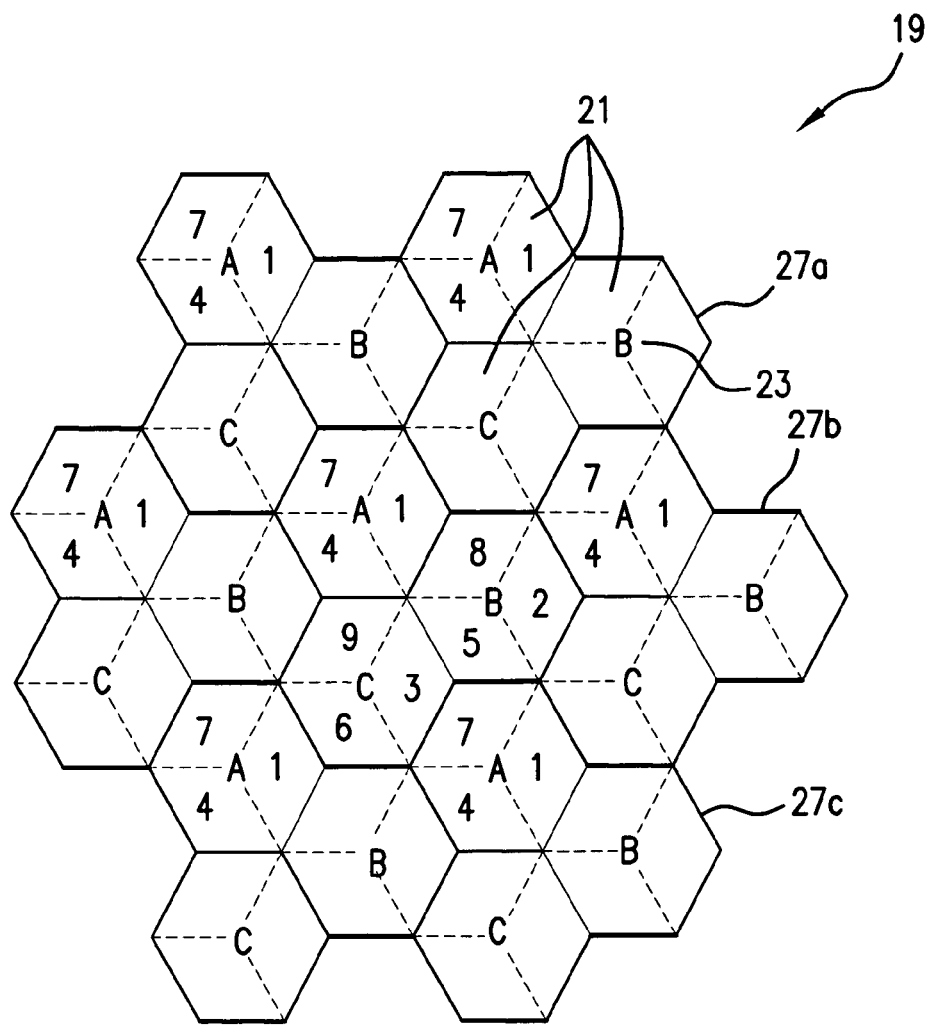
FIG. 2 is a schematic of a traditional frequency reuse layout having three cell types per tile and three sectors within a cell.
Figure 3:
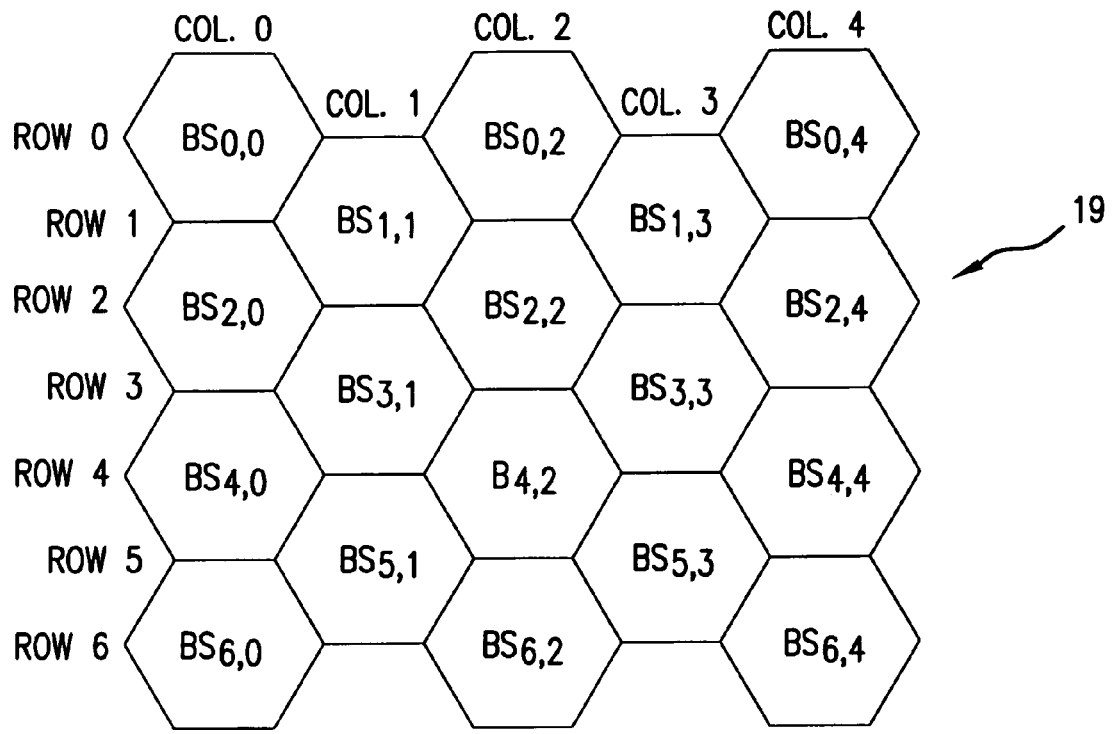
FIG. 3 is a schematic of a 7 row, 5 column grid of cells indexed according to the scheme of the present invention.

Referencing FIG. 3, a cellular system 19 has eighteen hexagonal wide beam cells arrayed in a grid of five columns (columns 0-4) and 7 rows (rows 0-6). Columns 0, 2, and 4 have four cells while columns 1 and 3 have three cells. Rows 0, 2, 4, and 6 have three cells. Rows 1, 3, and 5 have two cells. To index, or label the cells, the base stations central to the cells are designated $BS_{i,j}$, with i=row and j=column, starting in the upper left hand corner with i=0 and j=0.

Figure 4:
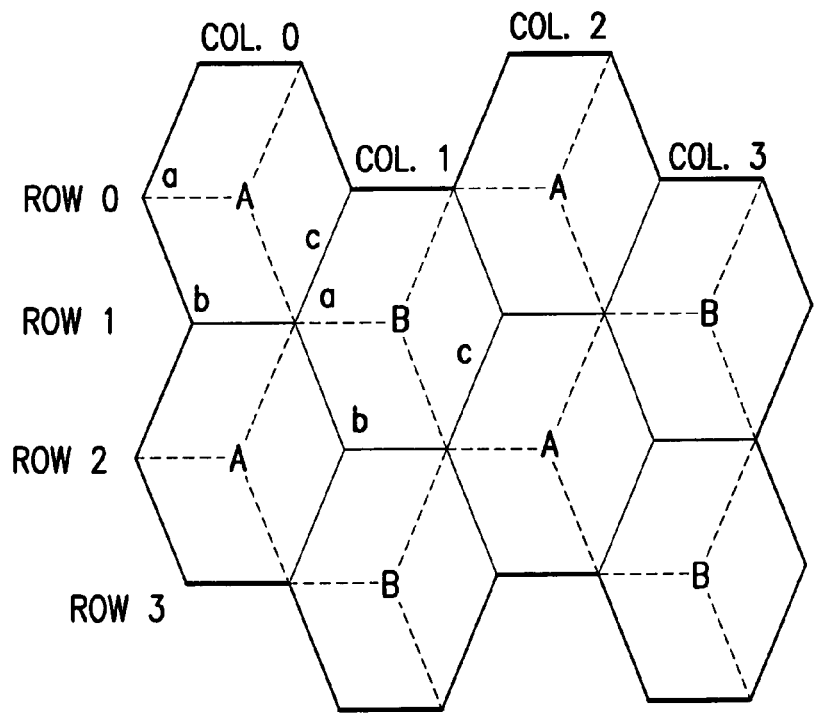
FIG. 4 is a schematic of a 4 row, 4 column grid of cells to be mapped according to a 2x(3+1) reuse plan of the present invention, with the three sectors labeled by lower case letters and two base station types labeled in upper case letters.
Figure 5:
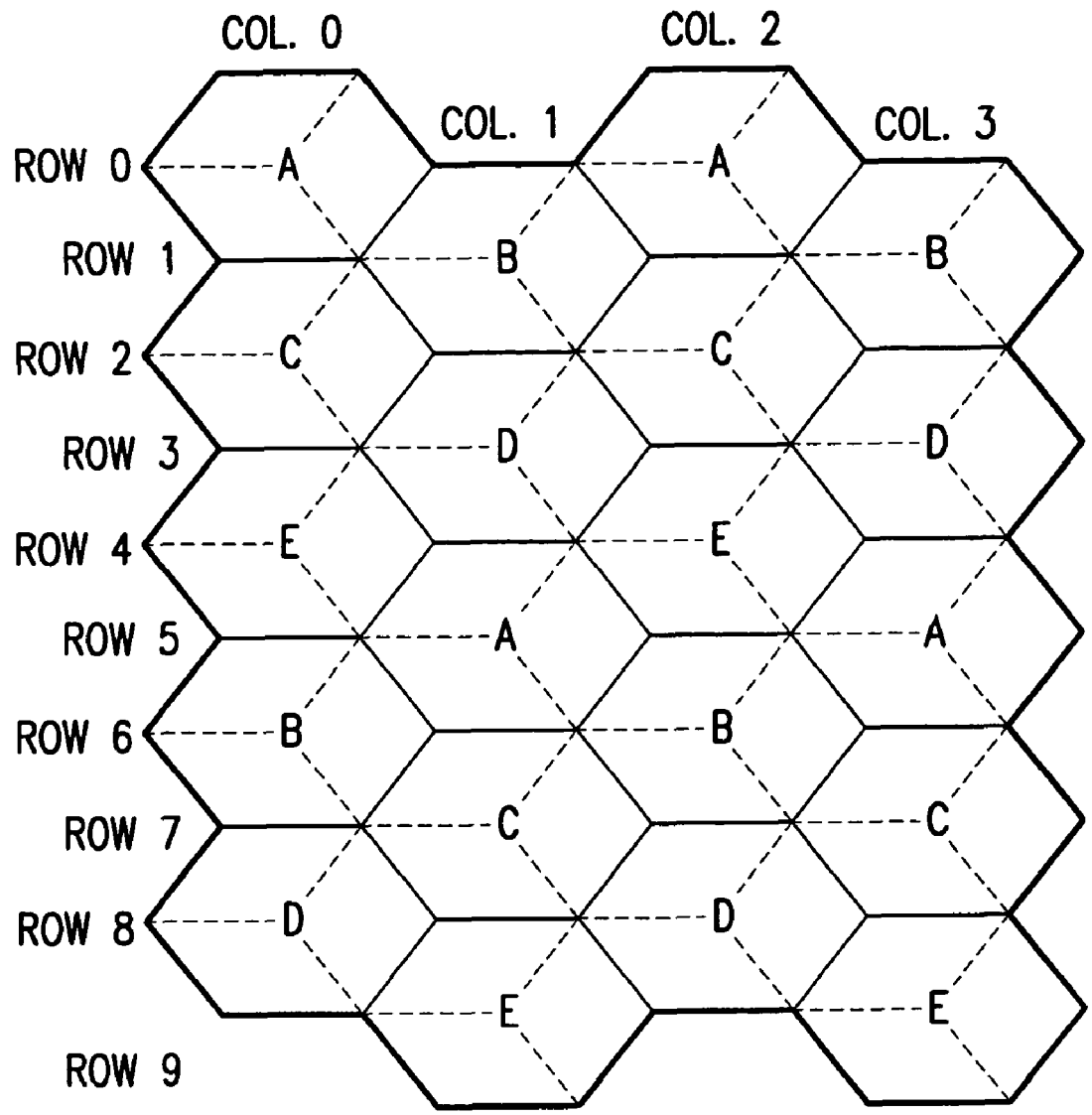
FIG. 5 is a schematic of a 10 row, 4 column grid of cells to be mapped according to a 5x(3+1) reuse plan of the present invention, with the five base station types labeled in upper case letters.

Referencing FIG. 4, after a determination of interference requirements for a given cellular system layout and technology, it is determined that only two cell types are needed, designated here as A and B. Even rows and columns (0 and 2) are designated A-type. Odd rows and columns (1 and 3) are designated B-type. In the system shown in FIG. 5, after a determination of interference requirements, it is determined that five cell types are needed, designated here as A, B, C, D and E. In FIG. 5, rows contain one cell type while columns contain each cell type.

An exemplary algorithm for cell designation utilizing four cell groupings per cell type is set forth below. The person having ordinary skill in the art will appreciate that larger index sequences or different starting points within the grid, or both, may be practiced within the spirit of the present invention and lead to similar results.

a) determining the number (N) of cell types required within the cellular communications system based on a co-channel interference requirement;
b) assigning ordinals to each of the number of cell types and setting CurrentCellType to the first cell type;
c) labeling the cells by cell type according to:
   i) if N is even:
   ii) step 1: label cells $BS_{i,j}$, $BS_{i,j+2}$, $BS_{i+N,j}$, and $BS_{i+N,j+2}$ as CurrentCellType, (where i=row and j=column)
   iii) step 2: increase i by 1,
      change CurrentCellType to the cell type having the ordinal next in sequence,
      if the ordinal of CurrentCellType is even set j=j+1, if ordinal is odd set j=j−1,
   iv) Step 3: repeat from c) ii) step 1 for all cell types of the tile,
   v) if N is odd:
   vi) step 1: label cells $BS_{i,j}$, $BS_{i,j+2}$ as CurrentCellType,
      if the ordinal of CurrentCellType is odd, label $BS_{i+N,j+1}$ and $BS_{1+N,j+3}$ with CurrentCellType,
      if the ordinal of CurrentCellType is even, label $BS_{i+N,j-1}$ and $BS_{i+N,j+1}$ with CurrentCellType,
   vii) step 2: increase i by 1,
      change CurrentCellType to the cell type having the ordinal next in sequence,
      if the ordinal of CurrentCellType is even set j=j+1, if ordinal is odd set j=j−1,
   viii) Step 3: repeat from c) vi) step 1 for all cell types of the tile.

After designation of the cell types, each cell then has the sectors therein assigned with channels, i.e., the directional antennae of the base stations will be designated to handle particular frequencies. Referencing FIGS. 6-9, a two-cell type grid has channels assigned to trisectorized cells according to the channel alternation and rotation (and reversal) scheme of the present invention. The general algorithm for channel assignment may be stated as:

1) allocate a distinct group of S+X channels for each cell type, where S is the number of sectors in a cell, and X is the number of channels needed to complete an alternation scheme that provides sufficient separation between co-channels,
   then for each cell:

2) allocate S of the channels from the cell type distinct group, subject to
   i) if any of the allocated group of S channels can be rotated to avoid front lobe interference with its nearest co-channel cell, rotate those channels, and
   ii) if i) cannot be accomplished, alternate a group of channels selected from S+X.

Figure 6:
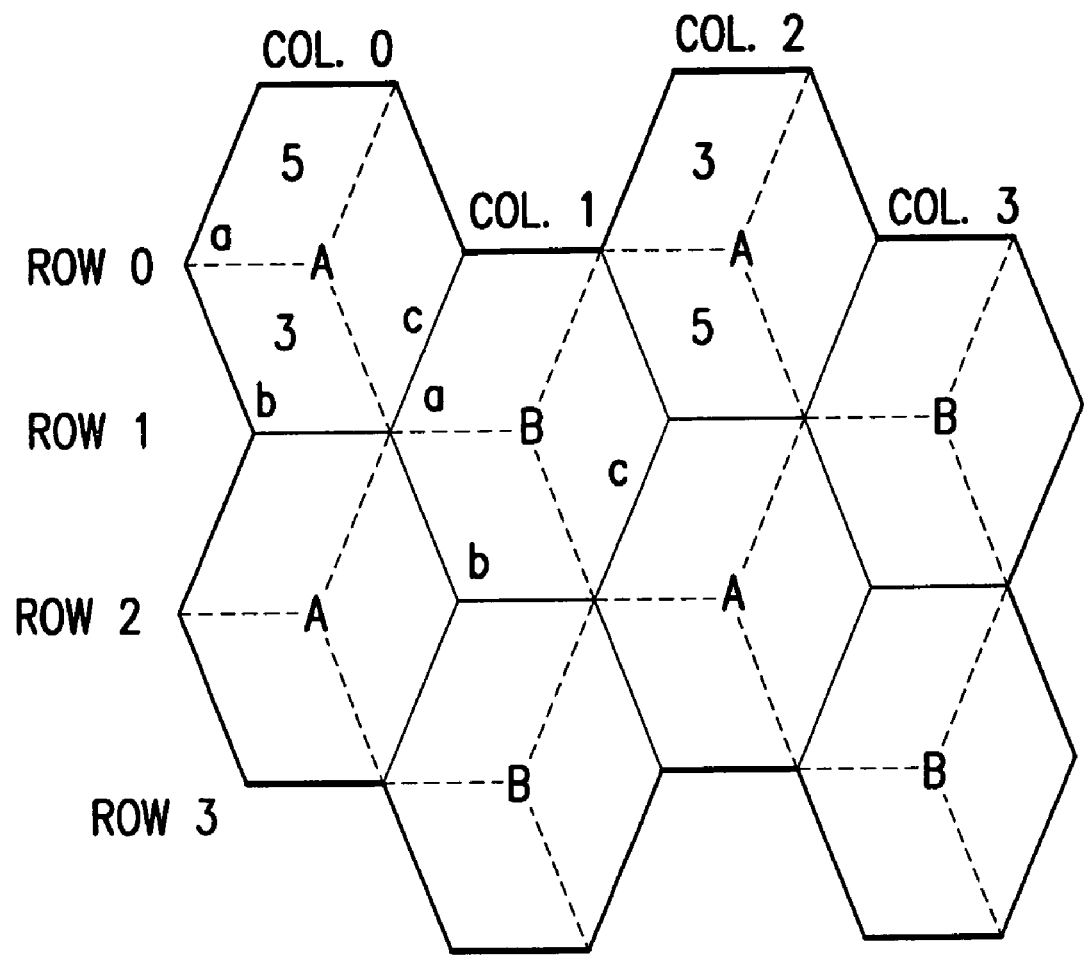
FIG. 6 is a schematic of a 4 row, 4 column grid of cells according to the 2x(3+1) reuse plan of the present invention, with the initial rotation pair placed sectors a and b, row 0.
Figure 7:
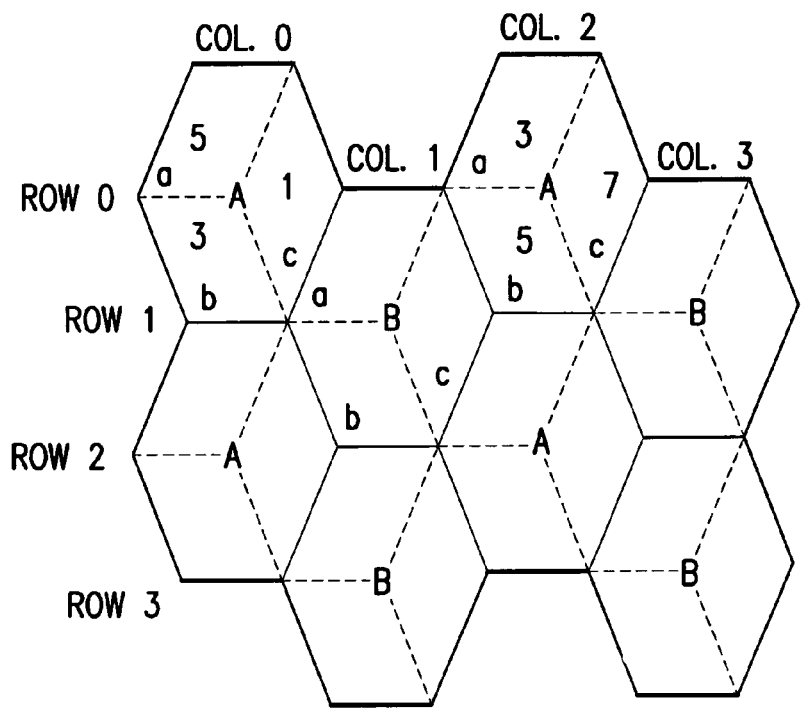
FIG. 7 is a schematic of the 4 row, 4 column grid of cells of FIG. 6 with the initial alternating pair placed in sector c of row 0.

Referencing FIG. 6, two A-type cells of the first row illustrate channel rotation of the present invention. Channels 1, 3, 5, and 7 are allocated for use in A-type cells. Channels 2, 4, 6, and 8 are allocated for use in B-type cells. Channels 3 and 5 are designated the rotating pair for the first row of cells. Cell $BS_{0,0}$ has sectors a and b allocated with channels 5 and 3, respectively. The next cell in row 0, Cell $BS_{0,2}$, has sectors a and b allocated with the rotating pair reversed, or rotated, such that sector a has channel 3 allocated and sector b has channel 5 allocated. Cell $BS_{0,4}$ (not shown until FIG. 9) would then have the rotating pair reversed again such that sectors a and b are allocated with channels 5 and 3, respectively. Referencing FIG. 7, sector c is then subject to allocation by use of the alternating pair of channels 1 and 7. In cell $BS_{0,0}$ sector c is allocated with channel 1. The next cell in row 0, Cell $BS_{0,2}$ has sector c allocated with the alternate channel of the alternating pair, i.e., 7.

Figure 8:
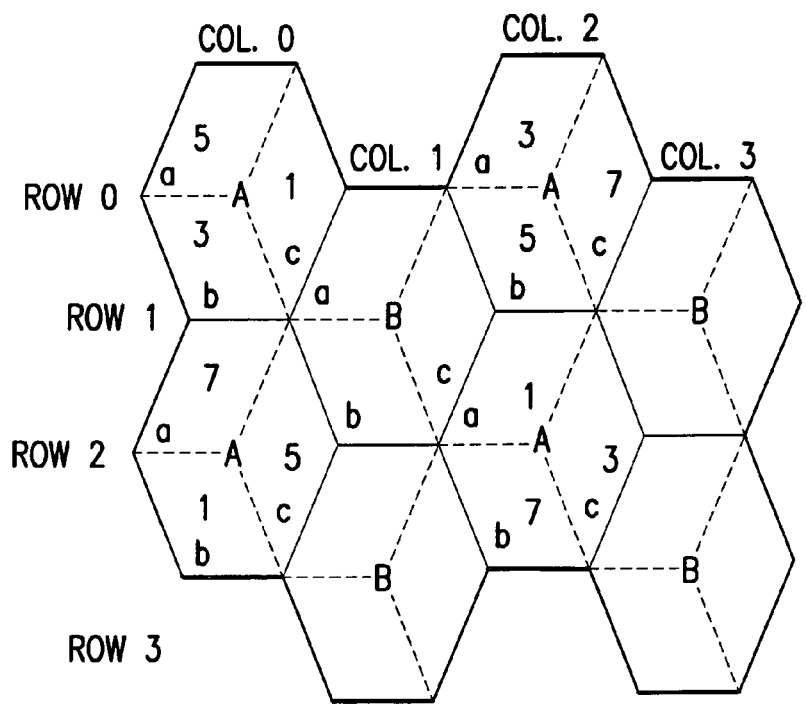
FIG. 8 is a schematic of the 4 row, 4 column grid of cells of FIG. 7 with the alternating pair and rotating pair reversed for allocation in row 2 and the front lobe interference between the c sector of rows 0 and 2 dictating placement of the initial selection of the channel of the alternating pair.
Figure 9:
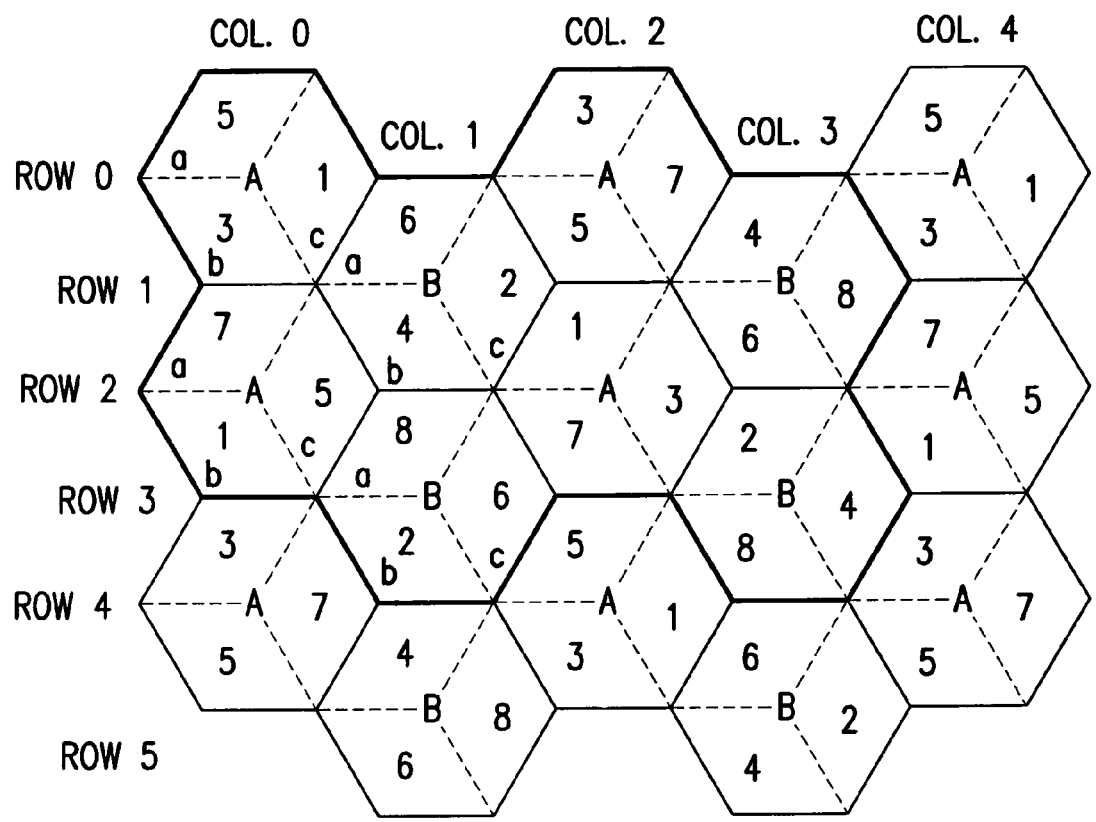
FIG. 9 is a completely allocated 6 row, 5 column grid of cells in a 2x(3+1) reuse plan according to the present invention.

Referencing FIG. 8, the next row of A cells, row 2 has its sectors allocated by reversing the alternating pair and rotating pair channels, i.e., the alternating pair becomes 3, 5 and the rotating pair becomes 1, 7. The rotating pair is placed in $BS_{2,0}$ sectors a and b to avoid front lobe interference, thereby placing channel 7 in sector a. If channel 1 is placed in sector a of $BS_{2,0}$, which is adjacent sector c of $BS_{0,0}$, also having been allocated with channel 1, front lobe interference may happen at the interface of the sectors. Likewise, in sector c, the initial alternating channel is selected to be 5 instead of 3 to avoid front lobe interference with sector b of $BS_{0,0}$, which is already allocated with channel 3. Thus within a row at the column changes, the channel allocations are rotated between designated sectors, and alternated, or substituted, between designated sectors. Between rows, the channel allocations are reversed between the alternating channels and the rotating channels. Thus, the scheme may be referred to as channel alternation, rotation (and reversal), or CAR. Referencing FIG. 9, the channel allocation is then completed for the sectors of the B-type cells using channels 6, 4 as the rotating pair of the first row, 1, of the B-type cells and channels 2, 8 as the alternating pair, thus resulting in a so-called 2x(3+1) reuse plan wherein there are two types of cells with four (three plus one) available channel allocations per cell.

In a conventional reuse system, each channel set, (i.e., a given positional designation of frequencies for sectors a, b, and c) is used once in the tile, thus in a tile of N cells, N is also the reuse factor. In a 2x(3+1) reuse plan, each channel set is reused 3 times in a repeating pattern of Nx(S+X) cells. Thus, the reuse factor for the present invention, labeled $N_{car}$, can be generalized as:

$$N_{car} = \frac{Nx(S + X)}{j}$$

where j is the number of times the same channel set is repeated in the pattern. Hence, $N_{car}$ for 2x(3+1), 3x(3+1), 4x(3+1), and 5x(3+1) is 2.7, 4.0, 5.3, and 6.7, respectively. Due to its smaller reuse factor, $N_{car}$=2.7 for a 2x(3+1), versus N=3 for a conventional 3x3, a 2x(3+1) reuse plan of the present invention increases channel capacity by 12.50% over 3x3 plan. Where N=2, or N=1, co-channel cells are contiguous. Thus, antennae with a high front-to-back ratio, e.g., greater than or equal to 25 dB, are recommended to take full advantage of a 2x(3+1), or 1x(3+1) pattern according to the present invention.

As seen in Table 1, for a Narrow-Beam System, such as illustrated in FIG. 10, and having a 9 dB co-channel interference requirement, the traditional 3x3 reuse plan results in the use of 1 channel per sector, or a 33% channel capacity per cell. An interleaved 2x3 reuse plan as put forth by Wang (supra.) results in a 50 percent channel capacity per cell, resulting in a 50% capacity increment. In the channel alternation and rotation (CAR) scheme of the present invention with a 1x(3+1) channel reuse plan, a 75% channel capacity per cell is achieved resulting in a 125% capacity increment over traditional 3x3 reuse and a 50% increment over the interleaved 2x3 reuse plan. Thus, the person having ordinary skill in the art will appreciate that significant channel capacity gains may be had by utilizing the scheme of the present invention. Tables 2, 3, and 4 show similar significant gains for a narrow beam system with a 14 dB requirement, a wide beam system with a 9 dB requirement, and a wide beam system with a 14 dB requirement, respectively.

TABLE 1

Narrow-Beam System 9 dB Requirement

| Reuse Plan | Capacity Per Cell | Capacity Increment |
|---|---|---|
| Traditional 3 × 3 | 33.33% | NA |
| Interleaved 2 × 3 | 50.00% | 50% |
| CAR 1 × (3 + 1) | 75.00% | 125% over Traditional 50% over Interleaved 2 × 3 |

TABLE 2

Narrow-Beam System 14 dB Requirement

| Reuse Plan | Capacity Per Cell | Capacity Increment |
|---|---|---|
| Traditional 3 × 3 | 33.33% | |
| Interleaved 3 × 3 | 33.33% | |
| CAR 2 × (3 + 1) | 37.50% | 12.50% |

TABLE 3

Wide-Beam System 9 dB Requirement

| Reuse Plan | Capacity Per Cell | Capacity Increment |
|---|---|---|
| Traditional 3 × 3 | 33.33% | |
| Interleaved 3 × 3 | NA for Wide-Beam | |
| CAR 2 × (3 + 1) | 37.50% | 12.50% |

TABLE 4

Wide-Beam System 18 dB requirement

| Reuse Plan | Capacity Per Cell | Capacity Increment |
|---|---|---|
| Traditional 7 × 3 | 14.29% | |
| CAR 4 × (3 + 1) | 15.00% | 5.00% |
| CAR 5 × (3 + 1) | 18.75% | 31.25% |

Various integer values for the Nx(S+X) formulations will work to gain good channel usage efficiency within the teachings of the present invention. For another example, good results can be demonstrated generally where X is less than or equal to S and specifically where N is 1 or 2, S is 6, and X is 2 or 4.

While certain exemplary embodiments have been put forth to illustrate the present invention, these embodiments are not to be taken as limiting to the spirit or scope of the present invention which is defined by the appended claims.

We claim:

1. A method for allocation of channels to base stations within the cells of a tile for reuse within a cellular communications system comprising:
   a) indexing the base stations (BS) within a cellular communications system according to rows and columns;
   b) determining a co-channel interference requirement within the cellular communications system;
   c) determining the number (N) of cell types required within the cellular communications system;
   d) placing only one cell type in each row;
   e) allocating channels to each cell according to:
      i) allocate a distinct group of S+X channels for each cell type, where S is the number of sectors in a cell, and X is the number of channels needed to complete an alternation scheme,
      ii) divide the S+X number of channels into rotating groups and alternating groups,
      iii) designate which sector types receive members of the rotating group,
      iv) designate which sector types receive members of the alternating group,
      v) for a first row, first column cell:
      allocate members of the rotating group into the designated rotating group sectors of the first row, first column cell,
      allocate at least one of the alternating group into the designated alternating group sector or sectors, and
      vi) for each succeeding cell in the row, rotate allocation of the members of the rotating group between or among the designated rotating sectors and alternate the allocation of members of the alternating group within the designated alternating group sector or sectors; and
   f) operating the base stations with the allocated channels.

2. The method of claim 1 further comprising, allocating members of the alternating group so as to avoid front lobe co-channel interference.

3. The method of claim 1, wherein each of the base stations comprises directional antennae, and further comprising assigning one of the allocated channels to each of the directional antennae.

4. The method of claim 3, wherein each of the directional antennae receives radio frequencies of the corresponding allocated channel.

5. A method for allocation of channels to base stations within the cells of a tile for reuse within a cellular communications system comprising:
   a) indexing the base stations (BS) within a cellular communications system according to rows and columns;
   b) determining a co-channel interference requirement within the cellular communications system;
   c) determining the number (N) of cell types required within the cellular communications system based on a co-channel interference requirement;
   d) placing only one cell type in each row;
   e) allocating channels to each cell according to:
      i) allocate a distinct group of S+X channels for each cell type, where S is the number of sectors in a cell, and X is the number of channels needed to complete an alternation scheme providing sufficient separation between co-channels,
      ii) divide the S+X number of channels into rotating groups and alternating groups,
      iii) designate which sector types receive members of the rotating group,
      iv) designate which sector types receive members of the alternating group,
      v) for a first row, first column cell:
      allocate members of the rotating group into the designated rotating group sectors of the first row, first column cell,
      allocate at least one of the alternating group into the designated alternating group sector or sectors,
      vi) allocate S of the channels from the cell type distinct group, subject to:
         A) if any of the allocated group of S channels can be rotated to avoid front lobe interference with its nearest co-channel cell, rotate those channels, and
         B) if A) cannot be accomplished, alternate a group of channels selected from S+X; and
   f) operating the base stations with the allocated channels.

6. The method of claim 5, wherein each of the base stations comprises directional antennae, and further comprising assigning one of the allocated channels to each of the directional antennae.

7. The method of claim 6, wherein each of the directional antennae receives radio frequencies of the corresponding allocated channel.

8. A method for allocation of channels to base stations within the cells of a tile for reuse within a cellular communications system comprising:
   a) indexing the base stations (BS) within a cellular communications system according to a row (i) and a column (j);
   b) determining a co-channel interference requirement within the cellular communications system;
   c) determining the number (N) of cell types required within the cellular communications system;
   d) assigning ordinals to each of the number of cell types and setting CurrentCellType to the cell type first in sequence;
   e) labeling the cells by cell type according to:
      i) if N is even:
      ii) step 1: label cells $BS_{i,j}$, $BS_{i,j+2}$, $BS_{i+N,j}$, and $BS_{i+N,j+2}$ as CurrentCellType,
      iii) step 2: increase i by 1,
      change CurrentCellType to the cell type next in sequence,
      if the ordinal of CurrentCellType is even set j=j+1, if ordinal is odd set j=j−1,
      iv) Step 3: repeat from e) ii) step 1 for all cell types of the tile;
      v) if N is odd:
      vi) step 1: label cells $BS_{i,j}$, $BS_{i,+2}$ as CurrentCellType,
      if the ordinal of CurrentCellType is odd, label $BS_{i+N,j+1}$ and $BS_{i+N,j+}3$ with CurrentCellType
      if the ordinal of CurrentCellType is even, label $BS_{i+N,j-1}$ and $BS_{i+N,j+1}$ with CurrentCellType,
      vii) step 2: increase i by 1,
      change CurrentCellType to the cell type next in sequence,
      if the ordinal of CurrentCellType is even set j=j+1, if ordinal is odd set j=j−1,
      viii) Step 3: repeat from e) vi) step 1 for all cell types of the tile; and f) allocating channels to each cell according to:
allocate a distinct group of S+X channels for each cell type, where S is the number of sectors in a cell, and X is the number of channels needed to complete an alternation scheme providing sufficient separation between co-channels,
then for each cell:
allocate S of the channels from the cell type distinct group, subject to:
  i) if any of the allocated group of S channels can be rotated to avoid front lobe interference with its nearest co-channel cell, rotate those channels, and
  ii) if i) cannot be accomplished, alternate a group of channels selected from S+X; and
g) operating the base stations with the allocated channels.

9. The method of claim 8, wherein each of the base stations comprises directional antennae, and further comprising assigning one of the allocated channels to each of the directional antennae.

10. The method of claim 9, wherein each of the directional antennae receives radio frequencies of the corresponding allocated channel.

11. A method for allocation of channels to base stations within the cells of a tile for reuse within a cellular communications system comprising:
a) indexing the base stations (BS) within a cellular communications system according to a row (i) and a column (j);
b) determining a co-channel interference requirement within the cellular system;
c) determining the number (N) of cell types required within the cellular communications system;
d) sequentially identifying the cell types and setting CurrentCellType to the cell type first in sequence;
e) labeling the cells by cell type according to:
  i) if N is even:
  ii) step 1: label cells $BS_{i,j}$, $BS_{i,j+2}$, $BS_{i+N,j}$, and $BS_{i+N,j+2}$ as CurrentCellType,
  iii) step 2: increase i by 1,
  change CurrentCellType to the cell type having the ordinal next in sequence,
  if the ordinal of CurrentCellType is even set j=j+1, if ordinal is odd set j=j−1,
  iv) Step 3: repeat from e) ii) step 1 for all cell types of the tile;
  v) if N is odd:
  vi) step 1: label cells $BS_{i,j}$, $BS_{i,j+2}$ as CurrentCellType,
  if the ordinal of CurrentCellType is odd, label $BS_{i+N,j+1}$ and j+3 with CurrentCellType,
  if the ordinal of CurrentCellType is even, label $BS_{i+N,j-1}$ and $BS_{i+N,j+1}$ with CurrentCellType,
  vii) step 2: increase i by 1,
  change CurrentCellType to the cell type having the ordinal next in sequence, if the ordinal of CurrentCellType is even set j=j+1, if ordinal is odd set j=j−1,
  viii) Step 3: repeat from e) vi) step 1 for all cell types of the tile;
f) allocating channels to each cell according to:
allocate a distinct group of S+X channels for each cell type, where S is the number of sectors in a cell, and X is the number of channels needed to complete an alternation scheme meeting the co-channel interference requirement,
then for each cell:
designate sectors a, b, and c,
allocate S of the channels from the cell type distinct group, subject to:
select a rotating group of channels from S+X,
select an alternating group of channels from S+X,
rotate members of the rotating group sectors a and b when a cell is in another column in the same row,
alternate members of the alternating group in sector c when a cell is in another column in the same row,
when changing to a new row make the rotating group of the previous row the alternating group for the new row and make the alternating group of the previous row the rotating group for the new row, and
placing the new row alternating channel to minimize co-channel front lobe interference; and
g) operating the base stations with the allocated channels.

12. The method of claim 11, wherein each of the base stations comprises directional antennae, and further comprising assigning one of the allocated channels to each of the directional antennae.

13. The method of claim 12, wherein each of the directional antennae receives radio frequencies of the corresponding allocated channel.

* * * * *